United States Patent [19]
Martin

[11] 3,963,054
[45] June 15, 1976

[54] SEAL ASSEMBLIES FOR WATER-WELL CASINGS

[76] Inventor: Carlyle J. Martin, Pierce Creek Road, R.D. No. 1, Binghamton, N.Y. 13903

[22] Filed: Sept. 17, 1975

[21] Appl. No.: 614,132

Related U.S. Application Data

[63] Continuation-in-part of Ser. No. 493,526, Aug. 1, 1974, Pat. No. 3,917,292, and a continuation-in-part of Ser. No. 595,851, July 14, 1975.

[52] U.S. Cl. ............................... 138/89; 277/112
[51] Int. Cl.² .................................. F16L 55/10
[58] Field of Search ............... 138/89, 90, 96 R; 277/110, 112

[56] References Cited
UNITED STATES PATENTS

| | | | |
|---|---|---|---|
| 1,059,053 | 8/1913 | Lennon | 138/90 |
| 1,152,888 | 9/1915 | Ferguson | 277/110 X |
| 2,299,434 | 10/1942 | Suirsky | 138/90 |
| 3,901,167 | 6/1974 | Reese | 138/89 X |

*Primary Examiner*—Samuel B. Rothberg
*Attorney, Agent, or Firm*—Richard G. Stephens

[57] ABSTRACT

A seal for the upper ends of waterwell casings includes a pair of cup-like devices, one inside the other, which extend over the end of the casing, and a central shaft which urges the cup devices apart to expand a rubber seal ring tightly against the outer periphery of the well casing.

7 Claims, 7 Drawing Figures

SEAL ASSEMBLIES FOR WATER-WELL CASINGS

This invention is a continuation-in-part of my prior co-pending applications Ser. No. 493,526 filed Aug. 1, 1974, now U.S. Pat. No. 3,917,292 and Ser. No. 595,851 filed July 14, 1975, and like the inventions of the prior applications, it relates to improved seals for the upper ends of casings of water wells, and more particularly, to improved seals which are easier to install and remove, and which are economical to fabricate.

Water wells utilized at suburban and rural residences in a large part of the United States ordinarily use a well casing, typically comprising plural sections of pipe 5 to 7 inches in diameter, which are welded (or threaded) together to extend 50 to 500 feet down into the earth to a water layer. A submersible electric motor-driven pump is immersed in the water layer near the bottom of the casing, being suspended from near the top of the casing by a water pipe, typically one inch in diameter, up which water is pumped. In geographical locations which are not frost free, the water pipe ordinarily extends outwardly through the side of the well casing two or three feet below ground level and then is routed underground to the residence. The upper end of the well casing extends typically 6 to 18 inches above ground level, so that ground surface water may not run into the casing and contaminate the well. It is necessary that an air passage or vent be provided near the top of the well casing, so that pumping of water from the well does not create a partial vacuum inside the well casing to prevent or impede water delivery. It is also necessary than an opening be provided near the top of the casing for an electrical cable needed to supply power to the motor of the submersible pump. It is important that such openings not allow rain water, vermin or insects to enter the well casing. While simple devices such as a plate with the required openings conceivably could be permanently welded or otherwise affixed to the top end of a well casing, the fact that the motor-pumps fail and sometimes must be replaced dictates that some form of removable seal or cap be provided, and various forms of removable well seals or caps are presently widely used.

Some well casings use successive threaded sections of pipe, while others have successive sections welded together. While it is theoretically possible in threaded casing installations to provide a removable well cap which threadedly engages threads provided at the upper end of the well casing, caps which thread onto the well casing are deemed impractical for a number of reasons. Turning a threaded cap to install it would undesirably twist the electrical cable which must pass through it, unless the able passed through an opening in the cap so large that insects or rainwater could also pass through the opening. Also, prohibitively great forces often would be required to unscrew a threaded cap which had been exposed to weather for some years. For such reasons, practical removable well caps cannot be threaded onto the upper ends of well casings, and the well caps in common use instead use seals including rubber rings which may be tightly clamped to the upper end of a well casing.

Various known well seals comprise plural metal plates between which a circular rubber seal is disposed, with means for clamping the plates very tightly together to radially expand the rubber seal, whereby the rubber seal is pressed tightly against the inside or the outside of the well casing. To insure that the rubber seal is adequately compressed around its entire periphery so as to form a watertight seal, the prior seals use a number of bolts spaced around the seal, each of which must be tightened with substantial force. Several important disadvantages of prior seals stem from their use of a plurality of bolts, or plurality of bolts and nuts. The bolts and nuts frequently must be installed under adverse climatic conditions. If bolts or nuts are accidentally dropped they are frequently lost in mud, snow or the like at a well side. The drive shoe of a well-drilling rig often provides a hole in the earth exceeding the outer diameter of the well casing, leaving a space surrounding the casing in which bolts and nuts may be irretrievably lost should they be accidentally dropped therein. One object of the present invention is to provide an improved seal assembly of a "single-piece" nature, i.e. which does not require the tightening and loosening of a plurality of bolts and/or nuts to install or remove the assembly. By provision of a single bolt means, the present invention allows a seal assembly to be installed or removed much more rapidly than prior assemblies, thereby providing a significant savings in labor costs.

As well as being lost during installation, well seal assemblies which utilize numerous bolts and nuts are disadvantageous because such parts are sometimes lost or mis-placed between the factory and the well site. One object of the invention is to provide a well seal assembly which may be completely assembled at the factory, and which then need not later be disassembled to allow its installation atop a well casing.

Prior art seal assemblies which use a plurality of bolts andor nuts spaced around the seal are also disadvantageous in and/or their threads sometimes become jammed or may be inadvertently stripped, sometimes ruining a seal assembly unless it is re-bored and re-tapped with a larger threaded hole, or sometimes requiring that spare bolts or nuts be obtained. Another object of the invention is to provide an improved seal assembly which obviates such problems. The bolts of prior seal devices which squeeze a circular rubber ring between metal plates must be tightened with amounts of force which are unnecessarily great, which tends to lead to stripping of threads or the breaking of bolts, and the excessive forces do not efficiently provide an increase in sealing effectiveness. Another object of the invention is to provide an improved seal assembly which provides more effective sealing, and does so without a need to apply excessive forces to any of its parts.

A further disadvantage of seals using plural bolts and nuts spaced around the seal is that they must be tightened evenly, i.e. by tightening a given bolt only partially and then proceeding to similarly tighten each of the other bolts before further tightening the given bolt, or else the seal assemblies, which frequently are made of cast iron, may fracture. Another disadvantage is that provision of plural independent bolts may cause the seal to grip tightly at some places around its periphery, but to grip much less tightly at other places, so that leaks may occur. An additional object of the invention is to provide an improved well seal assembly which does not require sequential tightening of a plurality of bolts and/or nuts, and a further object of the invention is to provide an improved well seal assembly which automatically expands a seal ring evenly around its entire periphery as a single bolt means is tightened.

The inventions shown in the abovementioned copending applications overcome many disadvantages of the prior art by provision of a cap having a shaft extending vertically therethrough to engage a flange means inside the well casing, so that rotation of the shaft moves the flange means to compress a rubber seal ring also carried inside the casing, expanding the seal ring radially outwardly so that the seal ring is pressed tightly against the inside of the well casing. One object of the present invention is to provide a further form of well seal which also overcomes the mentioned disadvantages of the prior art. In accordance with the present invention, I also provide a cap having a shaft extending vertically therethrough, but rather than being arranged to compress a seal ring radially outwardly to engage the inside of a well casing, the seal ring of the present invention is expanded radially inwardly to engage the outside of a well casing.

Another object of the invention is to provide improved well seal assemblies which are less expensive to fabricate, and which may use simple castings.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature, and objects of the invention reference should be had to the following detailed description taken in connection with the accompanying drawings, in which.

Figure 1:
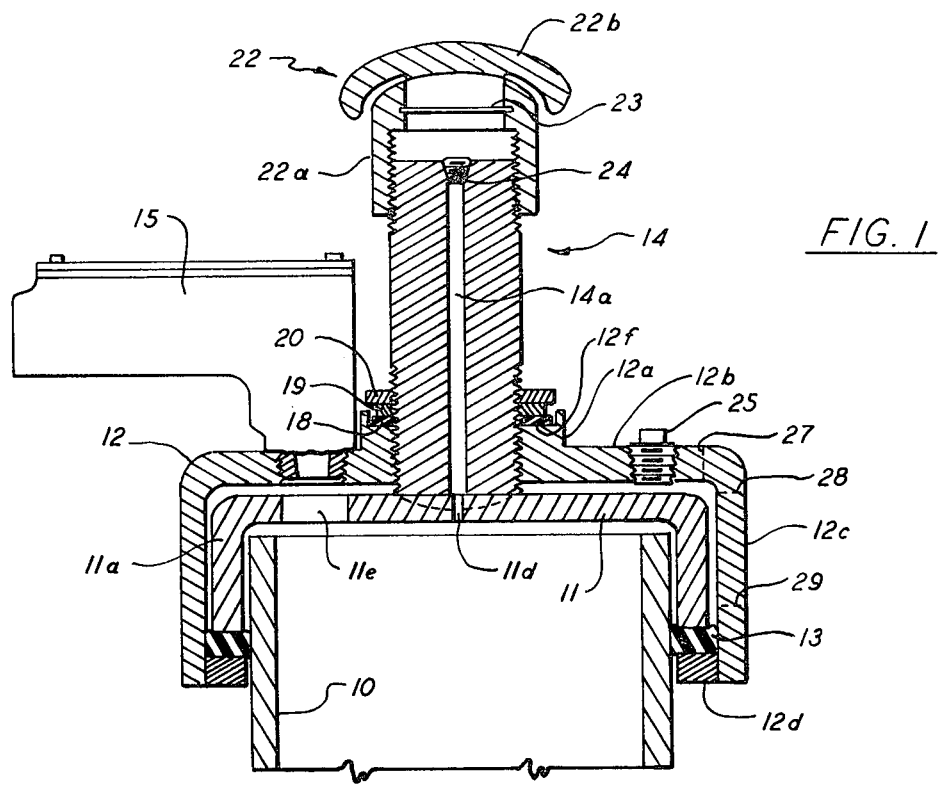
FIG. 1 is an elevation view in cross-section illustrating one form of the present invention.

In FIG. 1 the upper end of a section of well casing pipe is shown at 10. The improved seal assembly comprises a cylindrical inner cup device 11 which rests atop the end of casing 10, with the depending circular flange portion 11a of cup device 11 extending below the upper edge of the casing, and an outer cup assembly 12 which surrounds inner cup 11. Outer cup 12 includes a central internally-threaded hub portion 12a surrounded by a circular upper plate portion 12b, a depending annular flange 12c which extends below flange 11a of the inner cup, and a ring portion 12d affixed to flange 12c to act as an inwardly-extending flange. The inner diameter of annular flange 12c of the outer cup slightly exceeds the outer diameter of annular flange 11a of the inner cup. The inner diameter of flange 11a exceeds the outer diameter of the well casing 10. The upper end of a section of well casing is often not cut off perfectly square or horizontally, but it is in no way essential that cup 11 even engage casing 10, let alone engaging casing 10 entirely around its upper edge. A rubber, neoprene or other elastomeric O-ring 13 is situated between the lower edge 11b of flange 11a and ring portion 12d of the outer cup. A shaft 14 is threaded through the central hub portion of the outer cup so that the lower end of the shaft bears against a central portion of inner cup 11, and so that a small hole 11d through inner cup 11 communicates with a passage 14a extending through shaft 14. The lower end of shaft 14 is preferably slightly rounded and a cooperating rounded seat is provided in cup device 11, so that cup device 11 can tilt slightly relative to shaft 14. The circular top plate portion of inner cup 11 carries one or more through holes, one being shown at 11e, through which an electrical cable (not shown) may pass. The upper plate portion 12b of the outer cup 12 includes a tapped hole into which a standard conduit fitting 15 is shown threaded. Shaft 14 must be removed, of course, while the conduit fitting is threaded into the outer cap. A removable plug 25 is also shown threaded into plate portion 12b of the outer cup. The water pipe (not shown) within casing 10 extends from the pump (not shown) near the bottom of the casing to a point typically about three feet below the top of the casing, where a known form of device known as a "pitless adapter" (not shown) supports the weight of the water pipe and pump and allows the water pipe to extend laterally through the wall of the casing, from where it may run underground to the residence.

To install the seal assembly, it is merely lowered atop casing 10, until some portion or portions of the upper edge of the casing engage the upper portion of inner cup 11 to prevent further lowering movement. Shaft 14 is then screwed inwardly, using a pipe wrench (not shown), for example, which engages a portion of shaft 14 below vent cap 17 and above hub portion 12a. That portion of shaft 14 may be provided with several flats (not shown), if desired, to facilitate use of a different form of wrench. As shaft 14 is advanced, it raises outer cup 12, squeezing O-ring 13 between the lower edge of flange 11a and ring 12d of the outer cup. The vertical squeezing of the O-ring compresses the O-ring radially outwardly and inwardly, and because outward expansion of the O-ring is limited by the inner face of flange 12c, the O-ring is compressed substantially inwardly, tightly against the well casing 10 to form an effective seal. Because the lower edge of flange 12c, ring portion 12d and the O-ring are circular, equal sealing forces tend to be applied to the O-ring around the entire periphery of the seal. Irrespective of how the often somewhat jagged upper edge of the well casing may initially engage inner cup 11, as shaft 14 is advanced and the O-ring begins to expand, the compressive force of the O-ring can move, and slightly tilt cups 11 and 12, if necessary, so as to provide uniform pressure around the entire periphery of the seal. Inasmuch as the slightly-rounded lower end of shaft 14 merely butts against the slightly rounded depression on inner cup 11, it will be apparent that inner cup 11 may tilt slightly relative to shaft 14 and outer cup 12. Rotation of shaft 14 causes outer cup 12 to apply a very large upward force to inner cup 11 through O-ring 13, but also applies an equal downward force to inner cup 11, with the result that no appreciable net vertical force is applied to cup 11 (other than centering or aligning forces if cup 11 is initially mis-aligned), so that the entire assembly continues to rest atop the casing, with the weight of the wrench tending to hold it atop the casing as shaft 14 is rotated.

The central or hub portion 12a of the outer cup is shown as including, as an optional feature, an upper recess 12f in which a rubber washer 18 is seated surrounding shaft 14, with a metal washer 19 clamped atop the rubber washer by means of locknut 20. The upper end of shaft 14 is threaded to engage internal threads in the depending hub portion 22a of a conventional vent cap 22. Cap 22 comprises a generally-hollow dome portion 22b connected to hub 22a by a plurality of ribs so that air may flow between the interior of hub portion 22a and the outside of cap 22, through a screen 23 situated inside dome 22b atop hub portion 22a. The upper end of passage 14a is preferably internally threaded to receive a small plug 24. If plug 24 is removed, venting of the well may occur through vent cap 16, passage 14a and hole 11d. Alternatively, in applications such as where attachment of a preferred source of air is desired for venting, plug 24 may be left in place and plug 25 removed and replaced by a conventional tubing connector. In some applications both plugs 24 and 25 may be left in place and venting allowed to occur through conduit or cable fitting 15 and any conduit (not shown) connected thereto.

If and when it becomes necessary to remove the seal assembly, so as to withdraw the motor-pump, for example, the seal assembly may be easily removed by rotating shaft 14 in the reverse direction by means of a wrench, thereby lowering outer cup 12 so that O-ring 13 is no longer compressed by it, and then the assembly may be lifted off the casing. After long usage, rubber ring 13 may tend to stick to the outside of casing 10 even if it is no longer being squeezed. One or a few upward hammer blows on the lower edge of flange 12c will readily break the rubber ring loose from the exterior of the casing.

Well seal assemblies are frequently removed, after many years of use, by persons who are not familiar with the internal construction of such seals, and if bolts which tighten various prior art seals are loosened too much, portions of those seals may drop down inside the well casing and be irretrievably lost. However, if shaft 14 is even threaded completely out from cup 12, it will be seen that no part of the seal assembly of FIG. 1 can possibly drop down inside the casing.

Figure 1A:
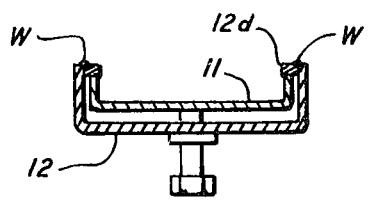
FIGS. 1a, 1b and 1c are partial cross-section views illustrating several alternative manners in which one of the parts shown in FIG. 1 may be fabricated.

As shaft 14 is rotated to tighten the seal assembly of FIG. 1, the compression of O-ring 13 will be seen to apply a large downward force to lower flange portion 12d of the outer ring, so that, as previously stated, ring portion 12d must be fixedly attached to depending flange 12c. It is necessary, however, that ring portion 12d be formed separately from flange 12c and then attached to flange 12c (or else that an alternative technique described below be used), since inner cup 11a must be inserted inside outer cup 12 even though the outer diameter of inner cup 11 must exceed the inner diameter of ring portion 12d. The ring portion 12d may be affixed to flange 12c in various different ways. In FIG. 1a, with cup 11 inserted inside cup 12 and raised by shaft 14 (or an equivalent bolt) to support ring 12d, the latter may then be welded to flange 12c as at W,W preferably around the entire periphery of ring 12d. The raised portion of the welding seam W then may be ground or turned off, for appearance's sake. Inasmuch as such welding may be accomplished most readily if cup 12 and its ring portion 12d are made of steel which has a tendency to rust, it is preferred that cups 11 and 12 be plated or coated after ring 12d has been welded, with a rust-resistant plating or coating, in a bath of plating or coating solution.

Figure 1B:
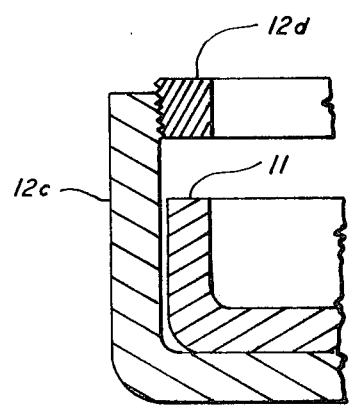
Figure 1C:
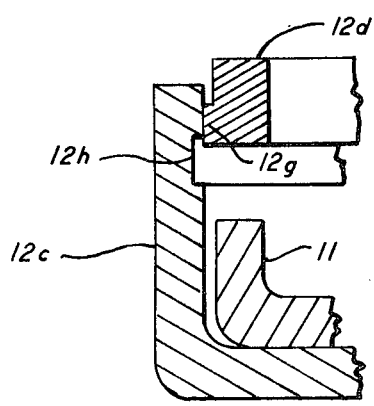

As illustrated in FIG. 1b, ring portion 12d alternatively can be threaded into flange 12c after cup 11 is placed inside cup 12. As further alternatives, ring 12d can be press-fitted into the flange 12c by means of a suitable hydraulic press (not shown), or heat shrunk into place (by heating flange 12c to expand it and/or cooling ring 12d to contract it during insertion of ring 12d. In FIG. 1c ring 12d is shown provided with an annular outer lip 12g, and flange 12c is provided with an annular inner recess 12h. As ring 12d is forced into flange 12c as by means of a hydraulic press, not shown, flange 12c is temporarily expanded radially outwardly until lip 12g reaches recess 12h, whereupon flange 12c snaps inwardly, locking lip 12g in recess 12h. It will be apparent that, if desired, the lip could instead be provided on the inside of flange 12c to snap into a cooperating groove in ring portion 12d.

Irrespective of the manner in which ring 12d is fastened to flange 12c, the O-ring 13, being quite resilient, may be easily thereafter inserted within cup 12 in between ring portion 12d and the lower edge of inner cup 11.

As an alternative to allowing insertion of cup 11 into cup 12 by provision of a separate later-attached lower ring, cup 12 may instead be made with a "split" elsewhere and welded or otherwise fastened together after inner cup 11 has been inserted. For example, it will be apparent that even if ring portion 12d were cast or otherwise formed integrally with flange 12c, cup 11 could be inserted inside flange 12c if cup 12 were initially peripherally split and then later fastened, as by welding, threading or a force fit, at any one of dashed lines 27, 28 or 29.

Figure 2:
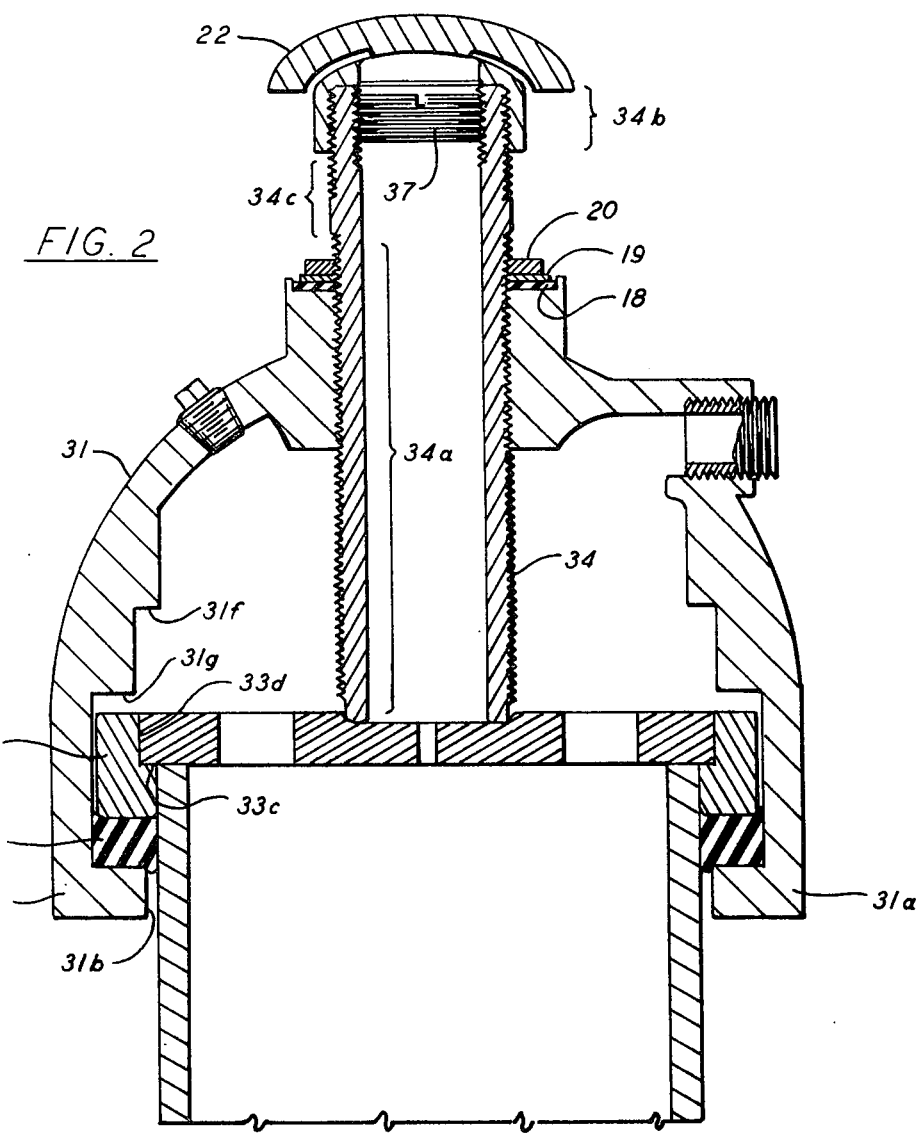
FIG. 2 is an elevation view in cross-section illustrating a further form of the present invention.
Figure 2A:
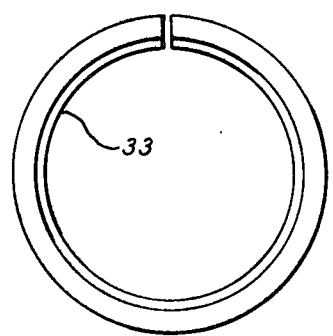
FIGS. 2a and 2b are plan views illustrating two alternative ways in which one of the parts of the device of FIG. 2 may be formed.
Figure 2B:
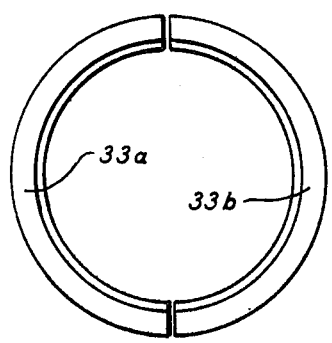

In the embodiment of the invention illustrated in FIG. 2, a generally dome-shaped cap 31 is provided a lower inwardly-extending flange 31a which supports a compressible seal ring 35. The diameter of annular surface 31b of flange 31a is made to slightly exceed the outer diameter of plate 32, so that the latter may be easily inserted within cap 21 during factory assembly, to lie against edge 31f, for example (when cap 31 is inverted from the position shown and shaft 34 is retracted from the position shown). Shaft 34 preferably comprises a piece of "double-strength" or heavy-wall pipe having exterior threads along a lower portion 34a and an upper portion 34b, having an unthreaded intermediate portion 34c, and internal threads near its upper end to accomodate a threaded plug 37. After installation of plate 32, a split ring 33 is then inserted in place within the cap. Ring 33 is split for sake of assembly because it has a greater external diameter than the opening defined by annular surface 31b of flange 31a. Ring 33 may comprise a one-piece ring having a single slit, and be formed of steel or cast iron, for example, which is sufficiently flexible to allow the ring to be momentarily compressed during installation, as shown in FIG. 2a, or ring 33 may comprise two (or even more) separate pieces, as shown in FIG. 3b, wherein ring 33 is shown as including two pieces 33a, 33b. Ring 33 is shown as including a horizontally-extending annular surface 33c upon which the outer lower edge of plate 32 rests, and a vertically-extending annular surface 33d which engages the peripheral edge of plate 32. With plate 32 positioned within cap 31 and lying against edge 31f, ring 33 is inserted, so that its upper edge (or edges in the case of a plural-piece ring) engages edge 31g of the cap. The compressible seal ring 35 is then inserted between ring 33 and flange 31a of the cap. With rings 33 and 35 in place, it will be seen that plate 32 is held within the cap, that no parts can fall from the cap, and that no separate parts need be carried or stocked. When shaft 34 is screwed inwardly, its lower end engages plate 32, initially forcing the plate downwardly so that its periphery engages surface 33d of ring 33 and its lower edge engages surface 33c, and upon further rotation of shaft 34, compressible ring 35 is squeezed between ring 33 and flange 31a, expanding the ring 35 radially inwardly.

While the water well seal assemblies are not subjected to substantial pneumatic pressures in actual use, the introduction of air pressure into a length of well casing carrying such a seal is a useful test of the effectiveness and integrity of the seal. An early embodiment constructed substantially in accordance with FIG. 1 to cover a 4-inch diameter well-casing was readily capable of withstanding a pressure of 35 psig without leaking, or an upward force of the order of 2200 pounds.

The rubber of elastomeric rings shown at 13 and 35 may have a variety of cross-sectional shapes, and the surfaces which engage the rings may be beveled or chamfered, if desired, as illustrated in my copending applications.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

I claim:

1. A well seal assembly for sealing the upper end of a hollow cylindrical well casing, comprising, in combination: a generally-cup-shaped outer member having a downwardly-extending first annular flange portion adapted to surround the outside of the end of said well casing, a second annular flange portion affixed to and extending inwardly from said first flange portion toward said casing and a threaded central bore; a generally cup-shaped inner device disposed within said outer member and having an annular ring means surrounding said end of said casing; a compressible seal ring disposed between said annular ring means of said inner device and said second annular flange portion of said outer member; and shaft means threaded through said central bore of said outer member to engage said inner device, whereby rotation of said shaft means will move said outer member upwardly relative to said inner device to compress said seal ring between said second annular flange portion and said annular ring means, causing inward radial expansion of said seal ring against the outer wall of said casing.

2. The assembly according to claim 1 wherein said cup-shaped inner device comprises a circular upper plate member having an integrally-formed depending annular flange forming said annular ring means.

3. The assembly according to claim 1 wherein said cup-shaped inner device comprises circular plate means having a diameter exceeding the diameter of said casing but not exceeding the inside diameter of said second annular flange portion, and split ring means having an outside diameter exceeding said inside diameter of said second annular flange portion.

4. The assembly according to claim 1 having a bore extending through said shaft means, and a hole through said cup-shaped inner device disposed to communicate with said bore through said shaft means.

5. The assembly according to claim 1 wherein said outer member is formed of steel and second annular flange portion is welded to said first annular flange portion.

6. The assembly according to claim 1 wherein the outer diameter of said cup-shaped inner device exceeds the inner diameter of said first flange portion of said cup-shaped outer member.

7. The assembly according to claim 1 wherein said second annular flange portion of said outer member comprises a ring seated within an annular internal groove in said first annular flange portion of said outer member.

* * * * *